United States Patent [19]
Krogstad et al.

[11] Patent Number: 5,488,980
[45] Date of Patent: Feb. 6, 1996

[54] SUSPENSION DEVICE FOR AN OIL TRANSFERRING PIPE OR HOSE

[75] Inventors: Ivar Krogstad; Kåre Sethre, both of Arendal, Norway

[73] Assignee: Pusnes AS, Norway

[21] Appl. No.: 306,528

[22] Filed: Sep. 13, 1994

Related U.S. Application Data

[63] Continuation of Ser. No. 937,888, Oct. 12, 1992, abandoned.

[30] Foreign Application Priority Data

Apr. 26, 1991 [NO] Norway .................................. 911676

[51] Int. Cl.⁶ .............................. F16L 3/16; F16L 27/02
[52] U.S. Cl. .................... 141/387.000; 141/279; 141/94; 141/100; 137/615; 285/93; 285/168
[58] Field of Search ...................... 141/100, 113, 141/94, 279, 387–389; 285/168, 93, 162, 168, 223, 272–274; 137/551, 559, 615; 114/230

[56] References Cited

U.S. PATENT DOCUMENTS

| | | | |
|---|---|---|---|
| 267,706 | 11/1882 | Mignault | 285/168 X |
| 457,246 | 8/1891 | Blattner | 285/168 X |
| 597,040 | 1/1898 | Vaughan | 285/168 X |
| 1,130,965 | 3/1915 | Doran | 285/168 |
| 2,319,068 | 5/1943 | Krone et al. | 285/274 |
| 2,927,607 | 3/1960 | Bily | 137/615 |
| 3,452,787 | 7/1969 | Bily | 141/388 |
| 3,700,014 | 10/1972 | Scales et al. | 141/388 |
| 3,805,834 | 4/1974 | Bily | 137/615 |
| 3,837,380 | 9/1974 | Davies | 141/279 |
| 3,974,864 | 8/1976 | Fournier et al. | 141/100 |
| 4,010,500 | 3/1977 | Reid, Jr. | 141/387 |
| 4,055,137 | 10/1977 | Motai et al. | 114/230 |
| 4,090,538 | 5/1978 | Kotcharian | 141/100 |
| 4,226,204 | 10/1980 | Tuson | 114/230 |
| 4,309,955 | 1/1982 | Kentosh | 114/230 |
| 4,388,948 | 6/1983 | Carminati et al. | 137/615 |
| 4,408,943 | 10/1983 | McTamaney et al. | 141/387 X |
| 4,653,554 | 3/1987 | Von Meyerinck et al. | 141/387 |

FOREIGN PATENT DOCUMENTS

| | | |
|---|---|---|
| 0166800 | 1/1986 | European Pat. Off. . |
| 146897 | 9/1982 | Norway . |
| 2191462 | 12/1987 | United Kingdom ............ 114/230 |

*Primary Examiner*—J. Casimer Jacyna
*Attorney, Agent, or Firm*—Andrus, Sceales, Starke & Sawall

[57] ABSTRACT

The invention relates to a suspension device for an oil conveying pipe or hose for loading or unloading of a vessel. The device is cardanic, and during unloading the oil is conducted towards the cardan center from one or both sides along a horizontal axis (A—A) through one or more pipe swivels (24) and possibly also bearings (10,10'). Thereafter, the oil flow is diverted and is conducted back towards the cardan center along the second cardan axis (B—B). After having passed the next pipe swivel (5) the oil flow is diverted to the third cardan axis (C—C), and in order to relieve this pipe swivel (5) bearings (3,3',4,6) may be arranged coaxially with the pipe swivel (5). The pipe bend (2) is in this case suspended in brackets (3,3') attached to a cylindrical load cell (4), which in turn pivots in a beam structure (6,8,8') which is an integral part of the pipe structure (9, 14, 13, 9'14',13') and which pivots about the first cardan axis (A—A). The load cell (4) is able to register the hose tension.

20 Claims, 3 Drawing Sheets

SUSPENSION DEVICE FOR AN OIL TRANSFERRING PIPE OR HOSE

CROSS REFERENCE TO RELATED APPLICATION

This application is a continuation of application Ser. No. 07/937,888, filed Oct. 12, 1992, now abandoned.

BACKGROUND AND SUMMARY

The present invention relates to a suspension for an oil conveying pipe or hose leading to a vessel.

In offshore oil loading it is common to transfer the oil to a vessel through a flexible metal pipe or rubber hoses. The terminations of these are relatively stiff, particularly for flexible metal pipes. Both the vessel and oil pipe are subjected to the forces of the sea, which in addition to variations in the pipe tension also give rise to variations in the fore and aft and athwartship angle between the pipe and its coupling to the vessel.

For oil transfer from the stern of a ship to the bow of another, or from a loading buoy to the bow of a ship, the variations in fore and aft angle are largest, and it has been common to suspend the coupling in the trunk part of a T-shaped pipe, the transverse part having been suspended in bearings on both sides. Here, a pipe swivel has been arranged on one or both sides of the transverse part, depending upon whether one or both of these parts have been carrying oil.

Oil carrying or conveying cardan joints have previously been used in mooring buoys for vessels, ref. U.S. Pat. Nos. 4,226,204, 4,309,955 and Norwegian patent 146897. These solutions have been developed in order to transfer mooring forces, which are much larger than the forces in the oil carrying pipe, and the design of the cardan joints employed reflects this fact. Furthermore, the geometric principles for routing the oil pipes through said cardan joints do not provide advantageous solutions for the suspension of an oil carrying pipe or hose to a vessel, not even if the basis for dimensioning the cardan joints were reduced to the hose tension at hand.

Vertical or approximately vertical oil carrying pipes from the sea floor or submerged buoys normally have a higher tension than those mentioned in the preceding paragraph, and hose tension is one of the most important criteria for determining whether or not the loading must be discontinued due to bad weather.

Measuring systems based on strain gauges and the like for hose tension have been included in the supporting structure for the coupling but it has been difficult to obtain sufficiently good measuring results since the suspension structure has been subjected to other factors than the hose tension. Furthermore, bending moments in the hose have also influenced the measurements. Bending moments in the hose have also caused additional loads in some of the claws in the coupling holding the hose coupler flange.

Therefore, it is very desirable to have freedom for the coupling to perform a pendulum movement in both the fore and aft and athwartship directions. The possibility to measure the hose tension is also of major importance. It has been suggested to use a ball joint suspension but the possible deflection angle may be too small for a ball joint suspension to be acceptable. Hose tension measurements can also be a problem when using ball joint suspensions. The object of the present invention is a suspension providing freedom for the coupling to adjust itself in the pipe pulling direction, such that no bending moment is transferred from the pipe to the coupling. Furthermore, one aims at measuring the pipe tension by means of elements included in the suspension.

This problem has been solved in that a 90° pipe bend at one end is coupled to an oil carrying rotation swivel, that one or two plates are welded to the pipe wall at right angles to the swivel axis, that these plates have a cylindrical bore coaxially with the swivel, that a cylindrical load cell, also functioning as a shaft, is arranged in the bore, that this shaft and the oil carrying rotation swivel are suspended in and coupled to an existing pendulum suspension for an oil carrying pipe in such a manner that the two pendulum axes are perpendicular, thus forming an oil carrying cardan joint. The coupling is attached to the other end of the pipe bend, and it may be of advantage to arrange the point of application of the force in the load cell coaxially with the coupling.

The invention will be described below, reference being had to an advantageous embodiment, while concurrently indicating alternative embodiments of some of the components.

DETAILED DESCRIPTION

Figure 1:
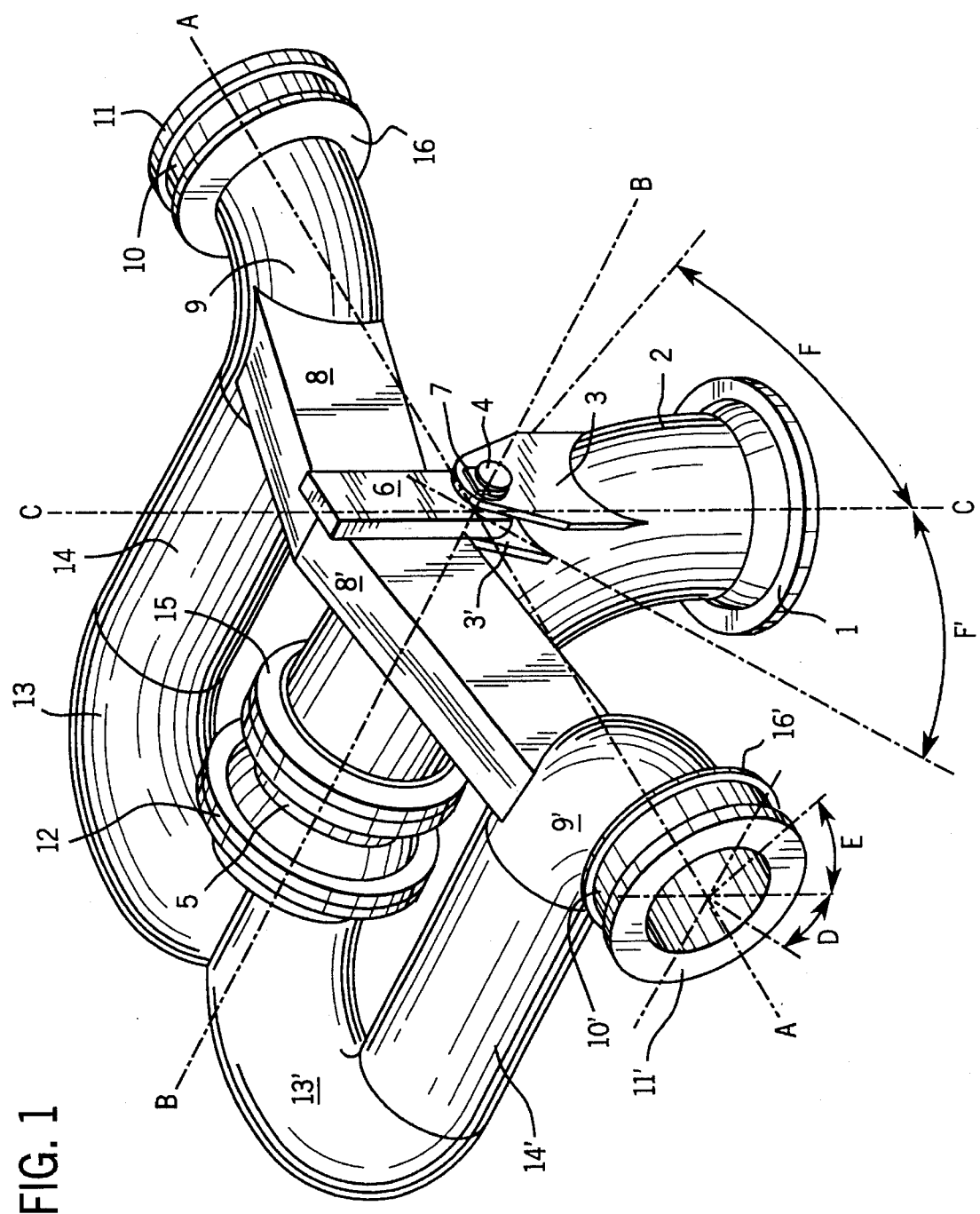
FIG. 1 shows a situation where the oil pipe conveying oil to the ship approaches vertically from below, while the same oil pipe in FIG. 2 approaches at a lateral angle with respect to the vertical. The three cardan axes are designated A—A (horizontal), B—B (horizontal middle position) and C—C (vertical middle position).

In FIG. 1 the pipe conveying oil to the ship may be flanged directly to the flange 1; however, it is desirable to have a closing valve for the oil and a quick coupler for the coupling flange on the oil pipe. Existing systems have a combined closing valve and quick coupler in this place and it is therefore logical to attach this coupling to the flange 1.

The flange 1 is welded to a pipe bend 2, which is suspended in two brackets 3,3', both including bearings and being welded to the pipe bend 2 In their upper ends the brackets 3,3' have bores for a cylindrical load cell 4, the middle portion of which is journalled in a vertical beam 6. Load cell 4 measures forces perpendicular to its longitudinal axis. The other end of the pipe bend 2 is welded to a flange 15, which is bolted to a pipe swivel 5. The two brackets 3,3' are bored coaxially with the pipe swivel 5, such that the pipe bend 2 may pivot about the common axis B—B. The load cell 4 is fixed with respect to the bracket 3 by means of a locking key 7.

The vertical beam 6 is welded to a beam structure 8,8', which in turn is welded to pipe bends 9,9'. These are welded to end pieces 16,16', having bearing surfaces 10,10' and end flanges 11,11'. The axis A—A for the bearing surfaces 10,10' is perpendicular to and coplanar with the axis B—B. Thus, a cardan suspension is formed for the oil carrying pipe or hose so that it cannot transmit bending moments to the suspension on board the vessel. The bearings in which the bearing surfaces 10,10' rest are not shown. These bearings are attached to the vessel structure.

The oil flow first passes through the pipe bend 2 and pipe swivel 5. After the pipe flange 12 the oil flow is divided in two 180° pipe bends 13,13' and proceeds through two straight pipes 14,14' and into the two 90° pipe bends 9,9'. Outside the pipe flanges 11,11' two pipe swivels (not shown) are connected by means of flanges and the oil passes through these pipe swivels to the pipe arrangement on board the vessel. Alternatively, the bearing surfaces 10,10' can be the inner rings of pipe swivels. This is a question of dimensioning of the pipe swivels.

The entire hose force or the major part of the hose force will be taken up by the load cell.

The cardan suspension for the oil carrying coupling permits the coupling to swing through the angles D and E about the axis A—A and the angles F,F' about the axis B—B.

Figure 2:
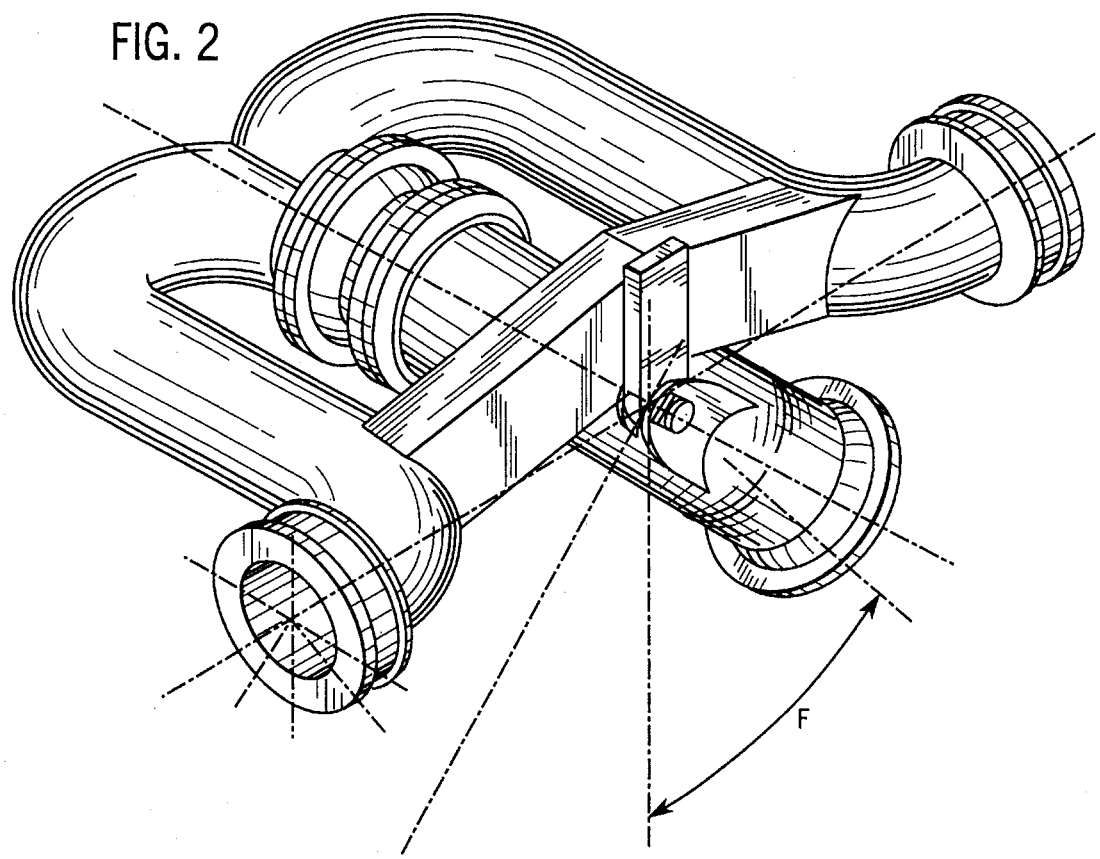

FIG. 2 shows a situation where the suspension has pivoted an angle F about the axis B—B.

Figure 3:
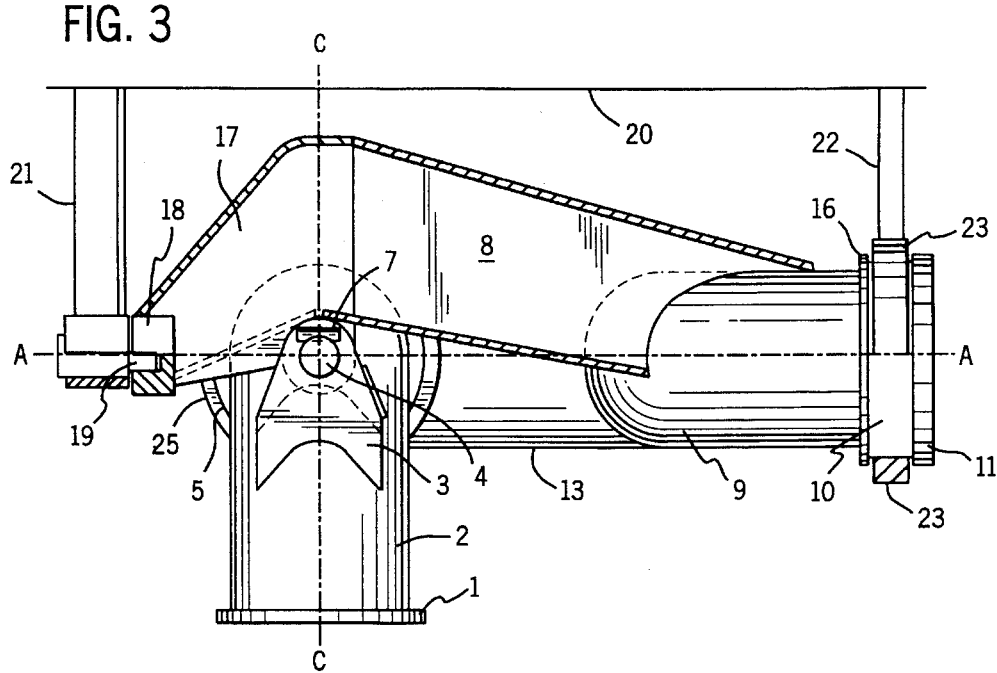
FIG. 3 is a side elevation view of an alternate embodiment of the invention.

FIG. 3 is seen parallel to the axis B—B and shows an embodiment where the oil flow is not divided after passage of the pipe swivel 5 with the flange 12. The elements 13',14',9',10',11',16' and 8' from FIG. 1 are no longer present. The structure from the beam 8 is extended through an extension 17 to the bearing housing 18, having a pivot centre in the axis A—A. The support structure for the trunnion 19 for the bearing housing 18 is continued through the bracket 21 to the structure 20 of the vessel.

The loads from the bearing housing 23 for the bearing surface 10 are transmitted through the bracket 22 to the structure 20 of the vessel. The lower half of the bearing housings 18, 23 are shown in section.

Figure 4:
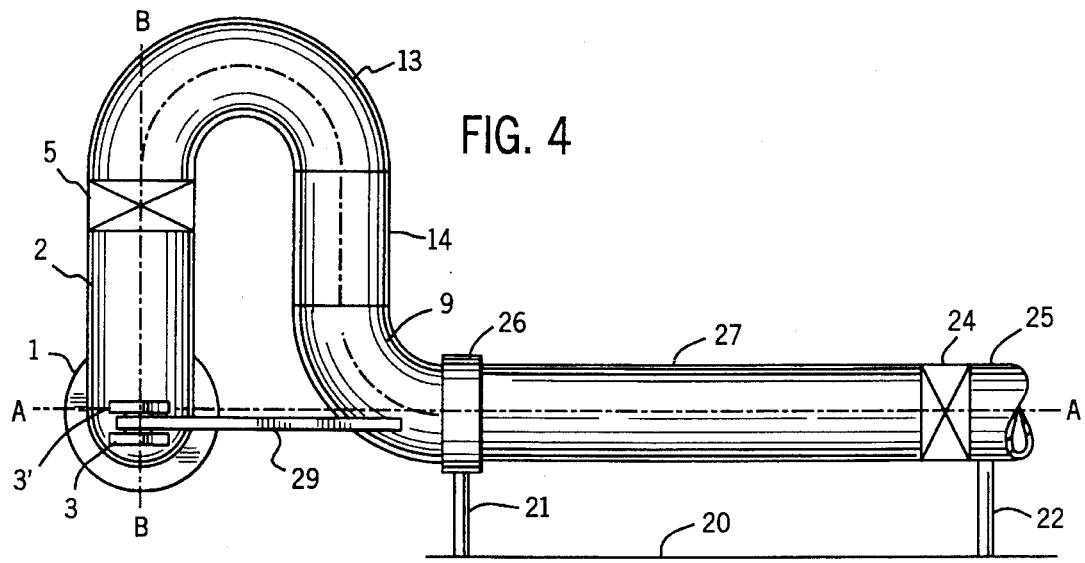
FIGS. 4–6 are schematic elevation views of additional embodiments of the invention.
Figure 5:
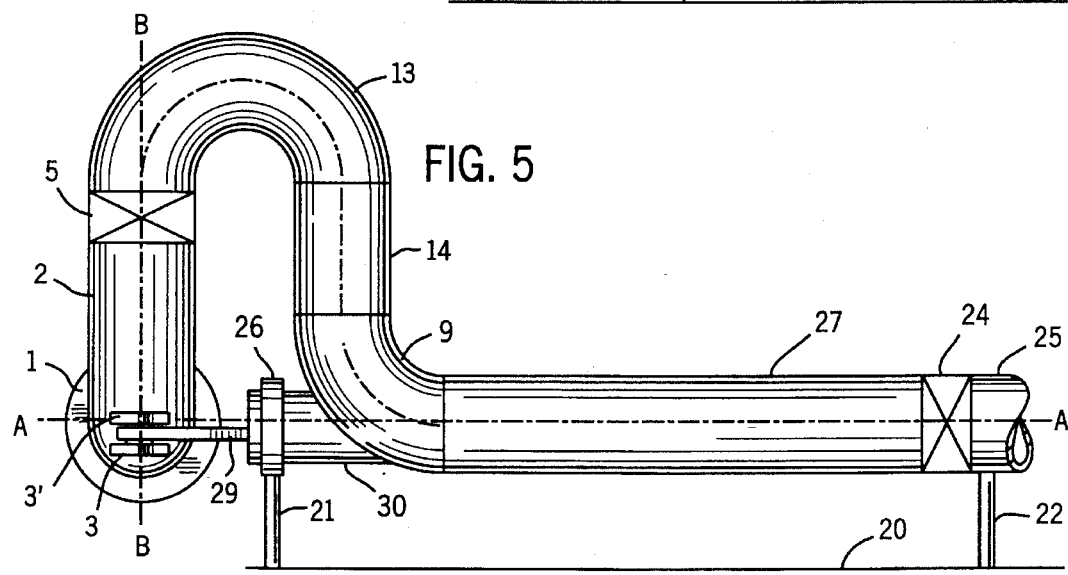
Figure 6:
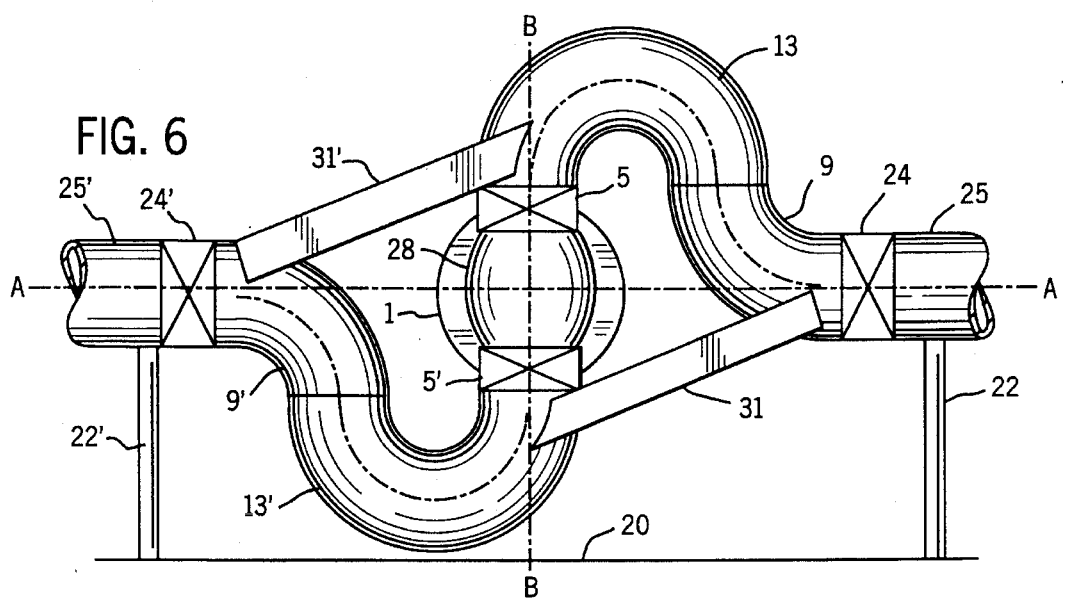

FIGS. 4, 5 and 6 are all viewed from above and are drawn more schematically than FIGS. 1–3. Also, the figures are seen parallel to the third cardan axis C—C. Pipe flanges which are not important for the function, are not included, and pipe swivels are indicated by an X, while the proportions correspond to FIGS. 1–3. In FIGS. 4–6 the following details from FIG. 1 can be found: Pipe bends 9 and 13, pipe swivel 5 and coupling flange 1 for coupling to the oil conveying pipe. The bearing surface 10 has been replaced by a pipe swivel 24, and it will be seen that these are connected to the vessel 20 by means of brackets 22 (ref. FIG. 3).

FIGS. 4 and 5 also show these details from FIG. 1: The straight pipe 14, the pipe bend 2 and the two small brackets 3,3' connecting the pipe bend to the load cell (4 not shown in these figures). The beam 29 has the same function as the beams 6,8 in FIG. 1.

FIG. 4 shows an embodiment where, after the pipe swivel 24 a straight piece of pipe 27 is inserted and having a bearing 26, the housing of which is connected to the vessel 20 by means of the bracket 21 before the oil flow is diverted in the bend 9. The beam structure 29 is an integral part of the pipe bend 9.

FIG. 5 shows a similar embodiment but here the bearing 26 is moved closer to the cardan centre and the inner ring of the bearing 26 is part of a pipe 30 which is coaxial with the first cardan axis A—A and is welded to the pipe bend 9. The beam 29 is extended to the pipe 30 and is welded thereto and to the pipe bend 9. The straight piece of pipe 27 is kept in order to increase the distance to the pipe swivel 24 and thereby reduce the stresses thereon.

FIG. 6 shows an embodiment that best may be compared to FIG. 1. In both these figures the oil flows from the suspended oil pipe through the flange 1 towards the cardan centre. In FIG. 1 the oil flow is diverted in the direction of the axis B and is thereupon divided and diverted to two parallel runs in the same direction before the two oil flows are diverted along the axis A—A in opposite directions. In FIG. 6 the oil in the T-shaped pipe is diverted and divided into two runs in opposite directions from the cardan centre along the axis B—B. Thereupon both runs are diverted to the axis A—A on either side away from the cardan centre.

The trunk of the T-pipe 28 has the flange 1, and the transverse part is journalled in the two pipe swivels 5,5'. The beam structure 31 connects the pipe bend 9 to the pipe bend 13' and, similarly, the beam structure 31' connects the pipe bend 9' to the pipe bend 13. In this way, all the structural members pivoting about the first cardan axis A—A form a rigid structure. This structure becomes very compact but loses the advantage of the load cell shown in the other figures.

In order to distinguish the invention with respect to the prior art, the patent claims define the oil flow during unloading. As previously noted, for vessels for loading and unloading oil through a pipe it has been common to suspend the pipe in a T-pipe which can pivot about an horizontal axis.

We claim:

1. A suspension device for an oil conveying conduit arranged on board a vessel for loading and unloading of oil and other fluids, wherein the suspension device includes pipe structure extending along a horizontal axis (A—A) through at least one first pivotable bearing (10, 10') attached (21, 22, 22') to the vessel (20), characterized in that the suspension is made cardanic by pipe structure which conveys the oil, after the first bearing (10, 10'), first away from (9, 9'), and then back toward (13, 13') the cardan centre in a run along the second cardan axis (B—B) and thereafter conveys the oil to a further run (2, 28) leading to the oil conveying conduit along the third cardan axis (C—C) in a direction away from the cardan centre, and in that the run from the second cardan axis (B—B) to the third cardan axis (C—C) is constituted by a pipe bend (2) journalled in a pipe conveying swivel (5) providing pivoting movement of the pipe bend in the second cardan axis (B—B), and that the pipe bend additionally is journalled on a cylindrical trunnion (4) located exteriorly of the pipe structure which is coaxial with the swivel (5) in a second bearing structure (3, 3') attached to the outside wall of the pipe bend (2), and that the cylindrical trunnion also is journalled to the pipe structure at the intersection of the first and second cardan axes.

2. A suspension device for an oil conveying conduit arranged on board a vessel for loading and unloading of oil and other fluids, wherein the suspension device includes pipe structure extending along a horizontal axis (A—A) through at least one first pivotable bearing (10, 10') attached (21, 22, 22') to the vessel (20), characterized in that the suspension is made cardanic by pipe structure which conveys the oil, after the first bearing (10, 10'), first away from (9, 9') and then back toward (13, 13') the cardan centre in a run along the second cardan axis (B—B) and thereafter conveys the oil to a further run (2, 28) leading to the oil conveying conduit along the third cardan axis (C—C) in a direction away from the cardan centre, and in that the run from the second cardan axis (B—B) to the third cardan axis (C—C) is constituted by a pipe bend (2) journalled in a pipe conveying swivel (5) providing pivoting movement of the pipe bend in the second cardan axis (B—B), and that the pipe bend additionally is journalled on a cylindrical trunnion (4) which is coaxial with the swivel (5) in a second bearing structure (3, 3') attached to the outside wall of the pipe bend (2), and further characterized in that the cylindrical trunnion is a load cell of the type that can measure the force acting perpendicularly to its axis, and in that the load cell is journalled to the pipe structure between the first and second cardan axes.

3. A device according to claim 2, characterized in that the load cell (4) registers only the force in one direction, and that the load cell is locked (7) with respect to the pipe bend (2) in order for the registering direction of the load cell to be parallel to the flow direction (C—C) for the oil where it is conducted out of the suspension during unloading.

4. A suspension device for an oil conveying conduit arranged on board a vessel for loading and unloading of oil and other fluids, wherein the suspension device includes pipe structure extending along a horizontal axis (A–A) through at least one first pivotable bearing (10, 10') attached (21, 22, 22') to the vessel (20), characterized in that the suspension is made cardanic by pipe structure which conveys the oil, after the first bearing (10, 10'), first away from (9, 9') and then back toward (13, 13') the cardan centre in a run along the second cardan axis (B—B) and thereafter conveys the oil to a further run (2, 28) leading to the oil conveying conduit along the third cardan axis (C—C) in a direction away from the cardan centre, and in that the run from the second cardan axis (B—B) to the third cardan axis (C—C) is constituted by a pipe bend (2) journalled in a pipe conveying swivel (5) providing pivoting movement of the pipe bend in the second cardan axis (B—B), and that the pipe bend additionally is journalled on a cylindrical trunnion (4) which is coaxial with the swivel (5) in a second bearing structure (3, 3') attached to the outside wall of the pipe bend (2), and that the cylindrical trunnion also is journalled to the pipe structure between the first and second cardan axes, wherein the oil flow is conducted into the suspension device from one side through the first bearing (10, 23, 24), and further characterized in that a third bearing is arranged coaxially with the first bearing (10, 23, 24).

5. A device according to claim 4, characterized in that the third bearing (26) is arranged on the same straight piece of pipe (27) as the first bearing (24) before the oil flow is diverted from the first cardan axis (A—A).

6. A device according to claim 4, characterized in that the third bearing (26) is arranged between the diversion (9) of the oil flow from the first cardan axis (A—A) and the cardan centre.

7. A device according to claim 4, characterized in that the third bearing (18,19) is arranged on the opposite side of the cardan centre with respect to the first bearing (10,23).

8. A suspension device for an oil conveying conduit arranged on board a vessel for loading and unloading of oil and other fluids, wherein the suspension device includes pipe structure extending along a horizontal axis (A—A) through at least one first pivotable bearing (10, 10') attached (21, 22, 22') to the vessel (20), characterized in that the suspension is made cardanic by pipe structure which conveys the oil, after the first bearing (10, 10'), first away from (9, 9') and then back toward (13, 13') the cardan centre in a run along the second cardan axis (B—B) and thereafter conveys the oil to a further run (2, 28) leading to the oil conveying conduit along the third cardan axis (C—C) in a direction away from the Cardan centre, and in that the run from the second cardan axis (B—B) to the third cardan axis (C—C) is constituted by a pipe bend (2) journalled in a pipe conveying swivel (5) providing pivoting movement of the pipe bend in the second cardan axis (B—B), and that the pipe bend additionally is journalled on a cylindrical trunnion (4) which is coaxial with the swivel (5) in a second bearing structure (3, 3') attached to the outside wall of the pipe bend (2), and that the cylindrical trunnion also is journalled to the pipe structure between the first and second cardan axes, and further characterized in that the oil is introduced in two runs and that the first diversion (9,9') is made to the opposite side and that the flow thus is conducted back (13,13') towards the cardan centre from two sides, and that beam structures (31,31') connect the pipe bends (9–13', 9'–13) so that these form a rigid unit pivoting about the first cardan axis (A—A).

9. A suspension device on board a vessel for a conduit, comprising a cardan joint having first and second pivot axes (B—B, A—A) intersecting at right angles and lying in a common plane, a pipe structure having a plurality of pipe bends (2, 9, 13) and at least one swivel (5), wherein a first one of said pipe bends (2) has two axes subtending an angle of 90°, one of said axes coinciding with said first pivot axis (B—B) of the cardan joint, said first pipe bend further having a pivotable support (4) for pivoting about said first pivot axis (B—B), characterized in that the other axis of said first pipe bend (2) is coincident with the axis of said conduit and perpendicular to said first pivot axis, and in that said pivotable support (4) is located at the intersection of the pivot axes (A—A, B—B) of the cardan joint.

10. A device according to claim 9, characterized in that the pivotable support comprises a cylindrical trunnion (4) which is journalled in bores in bracket means (3, 3'; 6) fixed to said one 90° pipe bend (2) and a yoke (8, 8'; 8, 17), respectively, said yoke being supported for pivoting about said second pivot axis (A—A) of the cardan joint.

11. A device according to claim 10, characterized in that said pip structure (9,13,14) has a single run journalled along said second pivot axis (A—A), and in that a further bearing (18) having a trunnion (19) is connecting the yoke (8,17) to the vessel.

12. A device according to claim 11, characterized in that said further bearing (18) is integral with the yoke (8,17).

13. A device according to claim 11, characterized in that a spherical bearing is incorporated between the further bearing (18) and its trunnion (19).

14. A device according to claim 10, characterized in that the cylindrical trunnion (4) is a load cell of the type that can measure the force acting perpendicularly to its longitudinal axis.

15. A device according to claim 14, characterized in that the load cell is of a type registering the force in one direction only, the load cell being locked with respect to said one 90° pipe bend (2) so that the registering direction of the load cell is parallel to the axis of said conduit.

16. A device according to claim 9, characterized in that said pipe structure comprises two symmetrical runs (9, 13, 14; 9', 13', 14') each having a pipe bend (9; 9') being diverted away from the centre of the cardan joint along said second pivot axis (A—A) thereof.

17. A device according to claim 16, characterized in that said pipe structure (9, 13, 14; 9',13',14') along said second pivot axis (A—A) is attached to end pieces (16; 16') having external bearing surfaces (10; 10') journalled in bearings attached to the structure of said vessel.

18. A device according to claim 17, characterized in that each of said end pieces (16; 16') is forming one part of a pipe swivel, the other part of the pipe swivel being attached to the structure of said vessel.

19. The suspension device of claim 16, wherein said pivotable support is carried by an arrangement (6,8) supported by the structure of said vessel and pivotable about said second pivot axis.

20. A suspension device on board a vessel for a pipe or hose, comprising a cardanic structure having first and second intersecting pivot axes (B—B, A—A) defined by a series of pipe bends (2, 9, 13) and at least one swivel (5, 11)

providing pivoting movement of said cardanic structure in each of said first and second pivot axes (B—B, A—A), wherein a first one of said pipe bends (2) extends along a pair of axes, wherein a first one of said pair of axes coincides with said first pivot axis (B—B) of said cardanic structure and a second one of said pair of axes coincides with the axis of said pipe or hose, wherein said first pipe bend includes a pivotable support (4) providing pivoting movement of said first pipe bend about a pivot axis coincident with said first pivot axis (B—B), and wherein said pivotable support is located exteriorly of said pipe bends at the intersection of said first and second pivot axes (B—B, A—A).

* * * * *